United States Patent [19]

Tschirch et al.

[11] 4,284,682

[45] Aug. 18, 1981

[54] HEAT SEALABLE, FLAME AND ABRASION RESISTANT COATED FABRIC

[76] Inventors: Robert A. Frosch, Administrator of the National Aeronautics and Space Administration, with respect to an invention of Richard P. Tschirch, Westwood and Kenneth R. Sidman, Wayland, both of Mass.

[21] Appl. No.: 145,107

[22] Filed: Apr. 30, 1980

[51] Int. Cl.³ .............. B32B 7/00; D03D 3/00; D04B 1/00; D04H 1/00
[52] U.S. Cl. .................. 428/263; 106/18.16; 106/18.24; 260/45.7 R; 427/393.3; 428/264; 428/265; 428/267; 428/272
[58] Field of Search ............ 427/393.3; 428/245, 428/267, 289, 290, 423.5, 263, 264, 265, 272; 260/45.7 R; 106/18.23, 18.16, 18.24

[56] References Cited

U.S. PATENT DOCUMENTS

| | | | |
|---|---|---|---|
| 3,833,540 | 9/1974 | Anderson | 260/37 N X |
| 3,847,723 | 11/1974 | Babayan | 427/393.5 X |
| 3,956,233 | 5/1976 | Fletcher et al. | 106/18.23 X |

*Primary Examiner*—Michael R. Lusignan
*Attorney, Agent, or Firm*—Russell E. Schlorff; John R. Manning; Marvin F. Matthews

[57] ABSTRACT

Flame retardant, abrasion resistant elastomeric compositions comprised of thermoplastic polyurethane polymer and flame retarding amounts of a filler selected from decabromodiphenyloxide and antimony oxide in a 3:1 weight ratio, and decabromodiphenyloxide, antimony oxide, and ammonium polyphosphate in a 3:1:3 weight ratio respectively. Also, flame retardant, abrasion resistant, and heat sealable coated fabrics employing such elastomeric compositions as coating film.

10 Claims, No Drawings

4,284,682

HEAT SEALABLE, FLAME AND ABRASION RESISTANT COATED FABRIC

ORIGIN OF THE INVENTION

The invention described herein was made in the performance of work under a NASA contract and is subject to the provisions of Section 305 of the National Aeronautics and Space Act of 1958, Public Law 85-568 (72 Stat 435, 42 U.S.C. 2457).

BACKGROUND OF THE INVENTION

1. Field of the Invention

The present invention relates to flexible, lightweight, air impermeable coated fabric which exhibits excellent resistance to flame and abrasion but which can be fabricated using heat (or dielectric) sealing procedures.

In the field of space exploration, high strength, flame retardant, abrasion resistant and leakproof materials are required for construction of clothing and containers e.g. bags. Such materials must have good strength and flexibility over the temperature and pressure ranges normally encountered in such endeavors. Additionally, because of the likelihood of encountering high oxygen content atmospheres, the materials must be flame retardant. Further, the garments, bags, etc. constructed from such materials must be leakproof to avoid loss of the life support atmosphere during periods of low pressure which may be experienced in a spacecraft.

2. Description of the Prior Art

In the prior art, as exemplified by U.S. Pat. Nos. 3,833,540; 3,956,233; 3,847,723; 3,202,567; 3,455,850; 3,954,701; 3,786,087; and 3,821,067, the use of flame retardant fillers and chemicals compounded with synthetic thermoplastic polymers to form compositions which have improved flame retardant properties is well known. It is also known, as shown in the references, to coat various fabrics with such compositions to produce flame retardant coated fabrics.

U.S. Pat. No. 3,956,233, to Fletcher et al, discloses elastomeric polymers compounded with flame retardant fillers to produce films and fibers having good flame retardant properties. Fletcher et al discloses that conventional polyurethanes of both the polyether and polyester types can be blended with fire retardant additives, particularly halogenated compounds and organic phosphorus containing compounds, to produce elastomer films and fibers exhibiting good flame retardant properties. Example IV of Fletcher et al discloses compositions of Lycra spandex polyurethane with various flame retardant additives. As can be seen from Table I of Fletcher et al, the additives severely reduce the tensile strength of the elastomeric compound compared to the original Lycra polyurethane.

The prior art does not disclose the flame retardant additive compositions of the present invention which, when blended with soluble, thermoplastic polyurethanes of the polyether or polyester type produce elastomeric compositions, which in addition to being flame retardant, also possess good abrasion resistance, flexibility, and heat sealing properties. In general, the flame retardant additives disclosed in the prior art reduce abrasion and tear resistance (tensile strength) and flexibility when blended with polyurethane polymers. Also, the flame retardant additives of the prior art, at loadings required to impart good flame retardant properties to soluble, thermoplastic polyurethanes, tend to severely reduce the heat sealing properties of the polyurethanes.

SUMMARY OF THE INVENTION

Now, according to the present invention, we have discovered elastomer compositions comprising flame retardant additives and soluble, thermoplastic polyurethanes which possess good flame retardant, abrasion resistant, flexibility, and heat sealing properties. Additionally, we have discovered heat sealable coated fabrics comprising a film of such soluble elastomeric compound bonded to a fabric which coated fabrics are suitable for use in construction of flame retardant, abrasion resistant, flexible and leakproof garments and articles.

In a preferred embodiment, the elastomeric composition of the present invention comprise about 30–50 wt % of a soluble, thermoplastic polyurethane of the polyester or polyether type blended with about 70–50 wt % of flame retardant additive composition selected from the group consisting of decabromodiphenyloxide and antimony oxide in a 3:1 weight ratio, respectively, and decabromodiphenyloxide, antimony oxide, and ammonium polyphosphate in a 3:1:3 weight ratio, respectively.

Coated fabrics having good flame retardant, abrasion resistant, flexibility and heat sealing properties are preferably produced by the method of dissolving the elastomeric composition in a solvent such as tetrahydrofuran to form a solution containing about 20–50% solids; casting the solution onto a release paper and drying to form an elastomeric film; and contacting a woven, knitted or felted fabric with said elastomeric film at a temperature of about 400° F., a pressure of about 30 psig, and for a period of about 10 seconds for bonding the film to the fabric under conditions of minimum strike-in.

Advantages of the elastomeric compositions, and coated fabrics produced therefrom according to the present invention include improved flame retardant properties coupled with abrasion resistance, flexibility, and good heat sealing properties. These and other advantages are disclosed in the detailed description which follows.

DESCRIPTION OF THE PREFERRED EMBODIMENTS

The flame retardant elastomer compositions of the present invention comprise a soluble, thermoplastic polyurethane, which may be of variable flamability, blended with novel flame retardant additive compositions in amounts such that the elastomer compositions possess good flame retardant properties while retaining substantial abrasion resistance and thermoplasticity of the polyurethane.

Polyurethanes useful in the present invention are soluble, thermoplastic, substantially linear polymers. The polyurethane molecules consist of an alternative arrangement of "soft" segments consisting of preferably polyester or polyether blocks joined by "hard" segments that generally contain aromatic urea and sometimes urethane groups as the rigid components. The rigid segments are derived from the reaction of isocyanates, preferably diisocyanates, with compounds such as amines, water, etc., producing urethane or urea linkages.

The production of polyurethanes is a well known commercial process, (see for instance Kirk-Othmer, "The Encyclopedia of Chemical Technology", First Supplement, pp. 888 et. seq., Interscience 1957). Briefly, the process involves the reaction of a diisocyanate and a second compound which contains an active hydrogen group such as hydroxyl, amino or carboxyl. The general procedure is to treat a dihydroxy polyester or dihydroxy polyether with a diisocyanate usually at temperatures in the range of 75° to 125° C. for producing a prepolymer. Generally about two moles of the diisocyanate are employed for each mole of dihydroxy polyester, or polyether, to ensure that the prepolymer is terminated on both ends by an isocyanate group. The isocyanate terminated prepolymer is then usually dissolved in a suitable solvent, such as anhydrous dimethyl formamide, and chain lengthing agents, such as diols or diamines, are added in amounts equivalent to the diisocyanate for extending the polymer into the polyurethane structure described above. Preferably an aliphatic diamine such as hydrazine is employed as the chain lengthening agent.

Dihydroxy polyesters are prepared in known manner from one or more dicarboxylic acids preferably containing at least 6 carbon atoms, their anhydrides, corresponding polycarboxylic acid esters of lower alcohols or mixtures thereof, and one or more dihydric alcohols. The polycarboxylic acids may be aliphatic, cycloaliphatic, aromatic and/or heterocyclic and may be substituted, e.g. with halogen atoms, and/or unsaturated. Halogenated compounds inpart additional fire retardant properties to the polyurethanes produced. Aliphatic dicarboxylic acids are preferred. Suitable dihydric alcohols include ethylene glycol, propylene glycol, butylene glycols, hexane-1, 6 diol, octane-1, 8 diol, neopentyl glycol, 1,4-bis-hydroxymethylcyclohexane, 2-methyl-1,3 propanediol, polyethylene glycols, polypropylene glycols and polybutylene glycols.

Polyethers with two hydroxyl groups may be prepared by polymerization of epoxides such as ethylene oxide, propylene oxide, butylene oxide, tetrahydrofuran, styrene oxide or epichlorohydrin in the presence of a catalyst such as borontrifluoride, or by adding these epoxides to starting components which contain reactive hydrogen groups such as water, dihydric alcohols or diamines.

Diisocyanates which may be used for preparing the polyurethanes include aliphatic, cycloaliphatic, aromatic and heterocyclic diisocyanates. Preferably the diisocyanate is one in which each isocyanate group is attached directly to an aromatic ring, such as 4,4' diphenylmethane diisocyanate or arylene diisocyanate.

Flame retardant additive compositions useful in the present invention comprise selected compounds in selected proportions, which when blended with the soluble, thermoplastic polyurethanes produce elastomeric compositions which have good flame retardant and abrasion resistant properties and which retain the ability to be heat sealed. Fire retardant compositions of the prior art tend to adversely affect abrasion resistance, tear strength, and the ability of elastomeric compositions to be heat sealed.

The flame retardant compositions of the present invention are selected from the group consisting of the mixture decabromodiphenyloxide and antimony oxide in a weight ratio of 3:1, respectively, and the mixture decabromodiphenyloxide, antimony oxide, and ammonium polyphosphate in a weight ratio of 3:1:3, respectively. As polyurethanes are generally flammable, substantial amounts of flame retardant additives must be blended to impart good flame retardant properties. The flame retardant additive compositions of the present invention may be blended with soluble, thermoplastic polyurethanes in weight ratios up to 70 parts retardant/30 parts polyurethane to produce flame retardant elastomer compositions which have good abrasion resistance and flexibility, and which may be heat sealed. At flame retardant additive/polyurethane weight ratios below about 50/50, the flame resistance imparted may not be sufficient. At flame retardant additive/polyurethane weight ratios above 70/30 the elastomeric composition may lose significant abrasion resistance and its ability to be heat sealed.

According to the present invention the flame retardant elastomeric compositions are bonded to fabrics to produce flame retardant coated fabrics having good abrasion resistance and which may be heat sealed. Such coated fabrics are particularly useful in making leak-proof garments which are useful in space exploration. The fabrics to which the elastomeric compositions may be bonded include woven or knitted fabrics and bonded webs of natural or synthetic fibers such as cotton, rayon, polyester, polyamide, etc. Particularly suitable fabrics for use herein are Nomex, nylon woven fabric, and Ripstop nylon woven fabric.

The elastomeric compositions may be bonded to a fabric by any convenient method such as calendering or applying a solution of the elastomeric composition to the fabric and subsequently evaporating the solvent. Heat sealable coated fabrics having good flame retardant and abrasion resistance properties with improved flexibility are obtained when the strike-in of the elastomeric composition into the web of the fabric is controlled. An improved method of bonding the elastomeric composition to a fabric comprises dissolving the elastomeric composition in a solvent, such as tetrahydrofuran, to form a solution comprising about 20–50% solids; casting this solution onto a release substrate, such as silicone release paper, in an amount which upon drying produces an even thickness film having a weight of about one to four ounces per square yard; contacting the film on the release substrate with fabric to be coated and applying heat and pressure thereto for a dwell time sufficient to bond the film to the fabric, without undue strike-in of the film into the fabric. Dwell times of about 10 seconds are adequate at 400° F. and 30 psig, for bonding the film to the fabric, yet at the same time minimizes strike-in of the coating and resultant stiffening of the fabric. For very flammable fabrics, or thin, lightweight fabrics it may sometimes be desirable to coat both sides of the fabric with elastomeric composition to further improve fire retardant characteristics.

In addition to bonding directly to a fabric, the elastomeric compositions of the present invention are also useful for bonding to other flame retardant polymer films, such as neoprene, for imparting the ability to be heat sealed to such other films without affecting their flame retardant characteristics. The elastomeric compositions may be applied to such other films by any convenient method including extrusion laminating and the transfer process. However, a solution of the elastomeric composition is preferably cast directly onto the other film, and the solvent subsequently evaporated to form a flame retardant, heat sealable composite film. The elastomeric compositions herein also impart improved abrasion resistance to such composite films.

The following examples are presented to more clearly demonstrate the present invention. These examples are expository in nature and are not intended as limitations of the invention which is set out in the claims appended hereto.

The following general test procedure was employed in evaluating the experiments noted in the following examples.

BOTTOM OXYGEN INDEX TEST (BOI)

Flammability of the samples was tested by an oxygen index method. In this test, the oxygen index, N, of a material is defined as the percentage concentration of oxygen in a mixture of oxygen and nitrogen at atmospheric pressure that will maintain equilibrium burning conditions. Physically, this percentage is the lowest concentration of oxygen that will support sustained combustion of the material and is computed according to the formula:

$$N = \frac{100\,[O_2]}{[O_2] + [N_2]}$$

where $[O_2]$ is the oxygen concentration at equilibrium and $[N_2]$ is the associated nitrogen concentration. Thus, the smaller the value of N, the more flammable the specimen. In conducting this test, a strip sample of the material 7–15 cm long $\times$ 6½ $\pm$ 0.5 mm wide was placed vertically in the center of a column. The column was filled with gases flowing at the rate of 5 cc per second and was ignited at the bottom with a hydrogen flame. The oxygen content of the flowing gas was varied until sustained combustion was obtained.

EXAMPLE I

Solutions of thermoplastic polyurethane and the flame retardant additive compositions of the present invention were formed:

The solution grade polyester-type polyurethane polymer (K. J. Quinn & Co., Inc., Q-Thane PS-26) having the base properties given in Table I, was mixed with the two flame retardant filler systems:

(1) decabromodiphenyloxide and antimony oxide (DBO/AO) in a 3:1 weight ratio, respectively; and
(2) decabromodiphenyloxide, antimony oxide, and ammonium polyphosphate (DBO/AO/AP) in a 3:1:3 ratio, respectively, to form mixtures of varying polymer/flame retardant additive weight ratio.

These mixtures were dissolved in tetrahydrofuran to form solutions containing about 40% solids.

TABLE I

| BASE PROPERTIES Q-Thane PS-26 | |
| --- | --- |
| Durometer | 89A |
| Tensile Strength | 5500–6000 psi |
| Elongation | 500–525% |

TABLE I-continued

| BASE PROPERTIES Q-Thane PS-26 | |
| --- | --- |
| Modulus at 300% | 2000–2500 psi |

The solutions of polymer/flame retardant additive were cast into films on silicone release paper and the solvent evaporated. These films were then heat bonded to two fabrics:

2.2 oz Nomex (Stern and Stern #HT65-30T)
0.9 oz Ripstop Nylon (Burlington Industries)

Fabric was contacted with a film on release paper and subjected to a temperature of about 400° F. and an applied pressure of about 30 psi for a dwell time of about 10 seconds.

For one sample of the 0.9 oz Ripstop Nylon, film was heat bonded, as described above, to each side of the fabric to increase flame retardant properties of the coated fabric.

Samples of the coated fabrics produced above were subjected to the Oxygen Index Test (BOI), results of which are shown in Table II below.

TABLE II

| OXYGEN INDEX BY BOTTOM IGNITION (BOI) OF FLAME RETARDANT, HEAT SEALABLE POLYURETHANE COATED FABRIC SAMPLES | | | | | |
| --- | --- | --- | --- | --- | --- |
| Sample Number | Flame Retardant Additive System | Polymer/Additive Weight Ratio | Fabric Type | Coated Fabric Weight (Oz/Sq. Yd.) | BOI |
| 1 | DBO/AO | 60/40 | 2.2 oz Nomex | 5 | 24 |
| 2 | DBO/AO | 40/60 | 2.2 oz Nomex | 5½ | 28 |
| 3 | DBO/AO/AP | 46/54 | 2.2 oz Nomex | 5½ | 28 |
| 4 | DBO/AO/AP | 30/70 | 2.2 oz Nomex | 5½ | 32 |
| 5 | DBO/AO/AP | 30/70 | 0.9 oz Nylon (coated one side) | 4½ | 23 |
| 6 | DBO/AO/AP | 30/70 | 0.9 oz Nylon (coated both sides) | 7½ | 29 |

As can be seen from Table II, all coated fabric samples had a BOI greater than 23. That is, none of the coated samples would burn in air at atmospheric pressure. Consequently the polymer/flame retardant compositions imparted substantial flame retardant properties to all coated fabrics. As can be seen from Samples 4 and 6, as the weight of flame retardant additive in the polymer/flame retardant mixture increased, the BOI increased substantially. For space garment applications, a BOI of about 30 is desirable to accommodate higher oxygen concentrations encountered in space vehicles. The coated fabrics of Sample 4 and 6 are suitable for such applications. Upon visual inspection, all coated fabric samples possessed good flexibility and abrasion resistance as required for fabrication into space garments.

Upon test, all coated fabric samples were found to be heat sealable, forming strong bonds at 400° F., 30 psig and 10 sec. dwell time. Consequently, the coated fabrics may be formed into garments and containers having sealed seams.

The 0.9 oz Nylon coated on only one side, Sample 5, had a tendency to drip melted polymer in the BOI test. Coating both sides of this lightweight fabric, Sample 6, improved flame retardant properties and eliminated the tendency to drip.

EXAMPLE II

Solutions of polymer/fire retardant additive as prepared in Example I were employed to impart heat sealing characteristics to a flame retardant neoprene coated nylon fabric. In this test, the polymer/flame retardant solutions were cast as films directly onto the neoprene coating and the solvent was evaporated. The polymer/flame retardant films bonded well to the neoprene without further treatments. Samples of the polymer/flame retardant-neoprene coated nylon fabrics were subjected to the Oxygen Index Test, the results of which are shown in Table III.

From Table III it is seen that the polymer/flame retardant-neoprene coated nylon samples exhibited good flame retardant properties.

Upon test, the polymer/flame retardant coatings of these coated nylon samples formed good bonds at heat sealing conditions of about 400° F., 30 psig applied pressure, and 10 seconds dwell time. The strengths of the polymer-neoprene bond and the neoprene-nylon bond were unaffected by the heat sealing process.

TABLE III

OXYGEN INDEX BY BOTTOM IGNITION (BOI) OF FLAME RETARDANT HEAT SEALABLE COATED FABRIC

| Sample Number | Flame Retardant Additive System | Polymer/Flame Retardant Weight Ratio | Fabric Substrate | Coated Fabric Weight (Oz.Sq. Yd.) | BOI |
|---|---|---|---|---|---|
| 7 | DBO/AO | 60/40 | Neoprene Coated Nylon | 9 | 29 |
| 8 | DBO/AO/AP | 30/70 | Neoprene Coated Nylon | 9 | 32 |

The compositions and coated fabrics disclosed herein can be used in any environment where it is desired to use a flame resistant coated fabric having good mechanical properties and being heat sealable. Particularly, these compositions may be used in garments and containers for space exploration. Additionally, such compositions and coated fabrics can be used in other articles such as rain gear, hazardous environment gear, leakproof containers, etc.

We claim:

1. A flexible, abrasion resistant, flame retardant coated fabric capable of being joined by heat or dielectric sealing procedures which coated fabric comprises a fabric substrate, selected from the group consisting of the woven, knitted and bonded web fabrics of synthetic and natural fibers, bonded to a flame retardant coating of an elastomeric composition comprising about 30 to about 60 wt. percent of a soluble, thermoplastic polyurethane and from about 70 to about 40 weight percent of a flame retardant additive selected from the group consisting of decabromodiphenyloxide and antimony oxide in a weight ratio of about 3:1, respectively, and decabromodiphenyloxide, antimony oxide and ammonium polyphosphate in a weight ratio of about 3:1:3, respectively.

2. The coated fabric of claim 1 wherein the fabric substrate is selected from the group consisting of woven and knitted fabrics of nylon fibers.

3. The coated fabric of claim 1 wherein the soluble, thermoplastic polyurethane is a polyester-type polyurethane, the weight ratio of polyurethane to flame retardant additive in said elastomeric composition being about 30:70, respectively.

4. A flame retardant coated fabric capable of being joined by heat sealing which comprises a fabric substrate bonded to a flame retardant polymer film which does not possess heat sealing characteristics, and a coating, bonded to said polymer coating, of an elastomeric composition comprising about 30 to about 60 wt. percent soluble, thermoplastic polyurethane and about 70 to about 40 wt. percent of a flame retardant additive selected from the group consisting of decabromodiphenyloxide and antimony oxide in a weight ratio of about 3:1, respectively, and decabromodiphenyloxide, antimony oxide, and ammonium polyphosphate in a weight ratio of about 3:1:3, respectively.

5. The coated fabric of claim 4 wherein the flame retardant polymer film is neoprene.

6. A method for producing a flame retardant, abrasion resistant coated fabric capable of being heat sealed, which method comprises: bonding to a fabric substrate a coating of an elastomeric composition comprising about 30 to about 60 wt. percent of a soluble, thermoplastic polyurethane and about 70 to about 40 weight percent of a flame retardant additive selected from the group consisting of decabromodiphenyloxide and antimony oxide in a weight ratio of about 3:1, respectively, and decabromodiphenyloxide, antimony oxide and ammonium polyphosphate in a weight ratio of about 3:1:3, respectively.

7. The method of claim 6 wherein said elastomeric composition is dissolved in a solvent to produce a solution containing about 20 to 40 wt percent solids, wherein said solution is cast as a film on a release substrate and solvent is evaporated therefrom, wherein said film is contacted with said fabric under conditions of elevated temperature and applied pressure for a dwell time sufficient to effect a bond between said film and said fabric, and wherein said release substrate is removed to yield a coated fabric.

8. The method of claim 7 wherein bonding temperature, applied pressure and dwell time are selected to ensure a bond between said film and said fabric and to minimize strike-in of said elastomeric composition into the web of said fabric.

9. The method of claim 8 wherein the bonding temperature is about 400° F., the applied pressure is about 30 psi, and the dwell time is about 10 seconds.

10. The method of claim 6 wherein a coating of said elastomeric composition is bonded to both sides of said fabric substrate for improving flame retardant properties of said coated fabric.

* * * * *